United States Patent

[11] 3,622,577

[72] Inventor Charles John Pedersen
 Salem, N.J.
[21] Appl. No. 774,493
[22] Filed Nov. 8, 1968
[45] Patented Nov. 23, 1971
[73] Assignee E. I. du Pont de Nemours and Company
 Wilmington, Del.
 Continuation-in-part of application Ser. No. 588,302, Oct. 21, 1966, now abandoned, which is a continuation-in-part of application Ser. No. 358,937, Apr. 10, 1964, now abandoned. This application Nov. 8, 1968, Ser. No. 774,493

[54] TRIMERIZATION OF ORGANIC ISOCYANATES
 16 Claims, No Drawings

[52] U.S. Cl. .................................................. 260/248 NS,
 260/77.5 NC, 260/338, 260/345.9, 260/613 D
[51] Int. Cl. ........................................................ C07d 55/38
[50] Field of Search .......................................... 260/248
 NS, 77.5, 77.5 NC

[56] References Cited
 UNITED STATES PATENTS
 3,330,828  7/1967  Grogler et al. ................  260/248

Primary Examiner—John M. Ford
Attorneys—Vernon R. Rice

ABSTRACT: A process for trimerizing organic isocyanates by mixing said isocyanates with a complex of a basic alkali metal salt and a macrocyclic polyether.

TRIMERIZATION OF ORGANIC ISOCYANATES

Related Applications

This application is a continuation-in-part of copending Application Ser. No. 588,302, filed Oct. 21, 1966, which in turn is a continuation-in-part of U.S. Application Ser. No. 358,937, filed Apr. 10, 1964 both of which applications are now abandoned.

BACKGROUND OF THE INVENTION

It is well-known that isocyanate compositions of various types in combination with active hydrogen compounds are useful in the preparation of numerous types of important commercial products, such as polyurethane coatings, elastomers and foams. In order to introduce special effects into these products, it is often necessary to modify the isocyanate composition used prior to reacting it with the active hydrogen compound, e.g., by preparing isocyanato-terminated prepolymers. Another important modification is the reaction of a portion of the isocyanato groups present to form isocyanate trimers (isocyanurates) in the isocyanate composition which is then reacted with such compounds as polyols, polyamines and water to form useful products. Such partially trimerized isocyanate compositions have reduced volatility and toxicity, increased light stability and because of their higher functionality, are especially valuable in preparing tough, highly insoluble polyurethanes.

It is known that aliphatic and aromatic isocyanates form trimers when treated with various basic catalysts. U.S. Pat. No. 2,978,449 to France and Lister discloses the use of basic catalysts such as sodium hydroxide and potassium acetate; U.S. Pat. No. 2,801,244 teaches the trimerization of aromatic isocyanates by use of phosphine catalysts and British Pat. No. 1,001,746 discloses compounds containing ethylene imine rings as catalysts for isocyanurate formation.

The prior art methods for trimerizing isocyanates have had certain disadvantages, however. Some of the catalysts recommended are unsafe to handle, some must be used in relatively high concentrations, and in general the prior art catalysts tend to give isocyanate condensates of a higher degree of polymerization than the simple trimers, which for many purposes are preferred.

SUMMARY OF THE INVENTION

According to this invention a process is provided for trimerizing an organic isocyanate which comprises essentially mixing said isocyanate with a complex of a basic alkali metal salt and at least one mole per gram atom of the cation of said compound of a macrocyclic polyether consisting of at least one vicinal arylene dioxy group or derivative thereof joined to form a macrocyclic polyether ring of at least 14 carbon atoms by α,ω-diprimary alkylene groups or α,ω-diprimary alkylene ether groups, the oxygen atoms of said macrocyclic ring being separated by two or three atoms.

DETAILED DESCRIPTION

The macrocyclic polyethers described above will hereinafter be referred to as "crown compounds". The term "macrocyclic" as used herein means a cyclic organic compound having a ring containing at least ten atoms. "Comprising essentially" means that the materials and process steps specified are essential; however, other materials and process steps can be used provided they do not significantly adversely affect the invention.

The term "arylene" is intended to include phenylene, naphthylene, anthrylene, phenanthrylene, and other polynuclear aromatic moieties; phenylene is preferred.

By derivative of an arylene dioxy group is meant substitution derivatives of the aromatic nucleus wherein the substituents contain no active hydrogen atoms and include but are not limited to halo, nitro, azo, alkyl, aryl, aralkyl, alkoxy, cyano groups and the like. Also included as derivatives of an arylene dioxy group are the saturated ring systems formed by the hydrogenation of the aromatic nuclei or their substitution products. The crown compounds are described herein by systematic names. These names are illustrated by the following formulae in which the ring positions are marked.

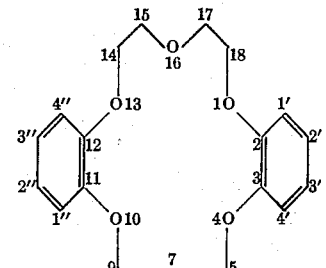

2,3,11,12-dibenzo-1,4,7,10,13,16-hexaoxacyclooctadeca-2,11-diene

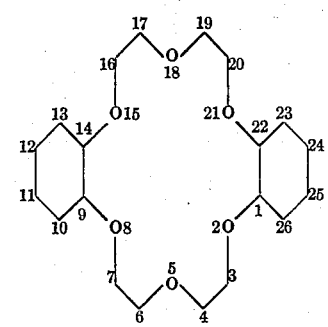

2,5,8,15,18,21-hexaoxatricyclo[20.4.0.0⁹·¹⁴]hexacosane

A preferred class of crown compounds can be represented by the general formula

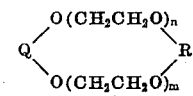

where Q and R can be divalent arylene groups with bonds attached to vicinal carbon atoms or derivatives thereof and R additionally can be -CH₂-CH₂-.

Where R is -CH₂-CH₂-, n +m can be three to eight inclusive.

Where R is an arylene group or a derivative thereof, n can be from one to nine and m can be from two to nine.

The above class of compounds can be made with particular ease, as will become apparent from a description of the mode of synthesis described hereinafter.

Another preferred class of crown compounds useful in this invention corresponds to the formula

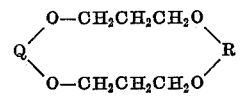

A general procedure for the synthesis of the crown compounds involves the following reactants:

a. a vicinal dihydroxy aromatic compound such as catechol.

b. an α,ω-alkylene diprimary dihalide or αω-alkylene ether diprimary dihalide compound in which the halogen and oxygen atoms are separated by chains of two to six carbon atoms, wherein the halogen is preferably chlorine, but can also be bromine or iodine; and c. at least one equivalent of a strong base, preferably sodium hydroxide, for each phenolic hydroxyl group. In general, equimolar quantities of (a) and (b) are consumed. The detailed procedure is selected to favor the particular type of crown compound desired and varies depending upon the nature of the dihydric phenol and the dihalide. When more than one crown compound is present in the reaction product conventional separation techniques such as selective solvent extraction, fractional distillation and fractional crystallization can be employed to obtain the compounds desired.

A typical reaction in which one molecule of dihydric phenol and one molecule of dihalide, as described above, are incorporated into the produce is as follows:

(I)
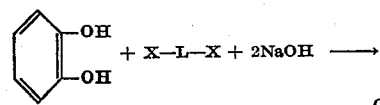

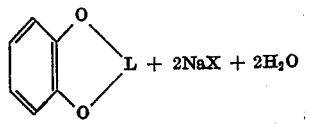

wherein L is a divalent organic group, which together with X is the ether compound of reactant (b) having at least two oxygen atoms and wherein X is halogen. For example in making the preferred compounds,

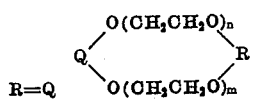

The compound X–L–X is $X(CH_2CH_2O)_p CH_2CH_2X$ where p is from one to seven.

In some instances, a significant proportion of polyaromatic crown compound can be formed, e.g. by incorporation of two molecules of dihydric phenol and two molecules of dihalide. Typical reactions are as follows:

(II)
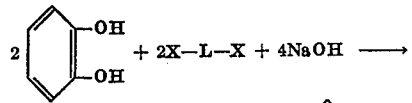

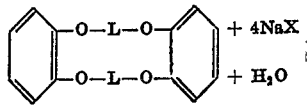

wherein L is a divalent group which together with X is either the alkylene or alkylene ether dihalide reactant of (b), or both, and wherein X is halogen. It is to be understood that monoaromatic crown products of this type given by reaction (I) will be present too. However, it is usually preferable particularly when mixed L groups are desired, to make the polyaromatic crown compound by a sequence of reactions characterized by the use of partially blocked dihydric phenols during the formation of at least one of the ring ether groups by reaction of the residual (unblocked) phenolic hydroxyl groups with a reactant (b). Later the blocked hydroxyl groups are regenerated for further condensation reactions with the same or different reactant (b). The blocked group must be stable toward base under the conditions of the reaction with X–L–X. Regeneration of the phenolic hydroxyl group afterward should not adversely affect the ether groups present. It is convenient to block the phenolic hydroxyl group by reaction with dihydropyran, typically.

(III)
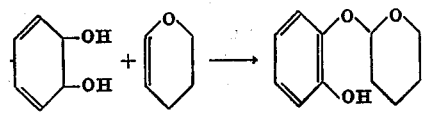

or alpha-chloromethyl ether (IV)
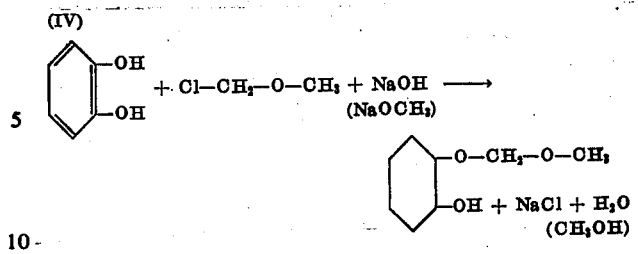

The blocked phenol is then reacted with the halide (V)
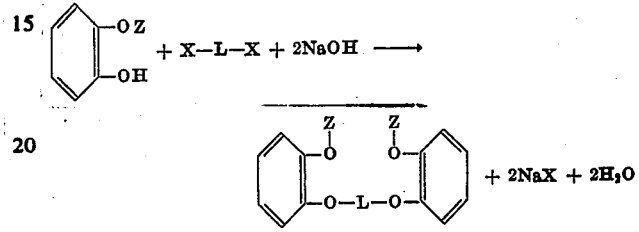

where Z is the blocking unit, e.g.

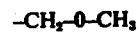

$-CH_2-O-CH_3$

Treatment with acid gives a dihydric compound (VI)
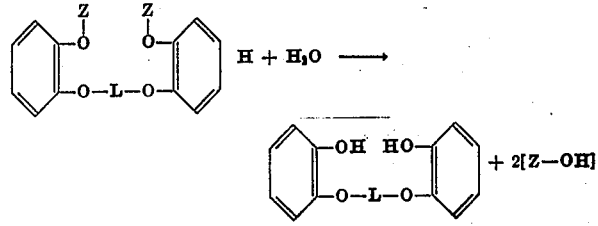

The dihydric compound can be isolated and purified, if desired. It may be partially blocked or it may be reacted directly with reactant (b). For example, the dihydric compound can be treated with a mole of X–L–X, wherein L is the same or a different divalent group to give the diaromatic crown compound.

(VII)
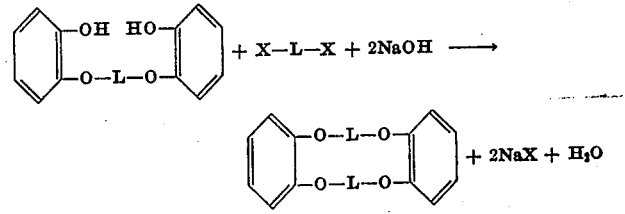

By employing a reactant (b) containing an aromatic nucleus, the number of such nuclei appearing in the polyether product can be increased to three or more. Other methods for determining the placement and quantity of aromatic nuclei in the final product will be obvious to the skilled chemist by reference to the foregoing reactions.

It is apparent that the particular dihalide or ether compound chosen for reactant (b) will determine, in part the quantity and composition of the ring atoms of the final product, with the hydroxyl oxygens and vicinal carbon atoms of the aromatic nucleus making up the remainder of the ring. The preparation of the crown compounds used in the present invention is not limited to the foregoing typical procedures since other methods are obviously applicable to obtain the macrocyclic polyethers hereinbefore defined.

Generally, the crown compounds are made in a solvent. In order to get good results, it is desirable that the solvent dissolve the basic reagent as well as the dihydric phenol and the dihalide. Representative solvent systems include mixtures of water and butyl alcohol; lower akyl ether derivatives of ethylene glycol; dioxane; alcohols; mixtures of ether and alcohol. The amount of solvent needed can be selected on the basis of operating convenience for a particular set of reactants.

The base for carrying out the substitution reaction is a group IA metal hydroxide, with sodium hydroxide being preferred. In place of the inorganic bases one can use quaternary ammonium hydroxides such as tetramethyl ammonium hydroxide or tetraethyl ammonium hydroxide.

The reaction can be carried out over a wide range of temperatures. For operating convenience, temperatures from about 90° to about 140° C. are preferred. The reaction time will vary depending upon the temperature and other factors. Other conditions being equal, the higher the temperature the shorter the time. Typically, time has ranged from about 6 hours to about 24 hours. The most suitable time and temperature for a particular set of reactants can be determined by routine experimentation.

The crown product can be isolated by conventional methods such as by concentration of the reaction mixture or by mechanical collection of insoluble (or precipitated) product. The crown compounds are freed from impurities, such as open-chain polyethers, by recrystallization from organic liquids such as alcohol, chloroform, 2-etholy-ethanol, benzene and heptane.

Saturated cyclic polyether crown compounds having a macrocyclic polyether ring fused to hydrogenated aromatic rings are preferred in this invention. Such compounds can be made by catalytic hydrogenation of the corresponding aromatic compounds such as those described hereinabove by techniques familiar to those skilled in the art. Suitable hydrogenation catalysts are ruthenium dioxide, ruthenium dioxide on charcoal, ruthenium dioxide on alumina, platinum oxide and platinum on charcoal. The solvent can be any suitable hydrogenation solvent which will dissolve the crown compounds. Dioxane is suitable as a solvent. The aromatic crown complexes of nonreducible salts such as the alkali halides can be hydrogenated in alcohols such as methanol and n-butanol.

The temperature of hydrogenation is suitably from 60° to 120° C. Pressures can range from 500 to 2000 p.s.i.g. Typical times required are from 3 to 20 hours. It will be realized, however, that these values are not critical.

Some cleavage of the macrocyclic polyether ring occurs, leading to the formation of dihydric alcohol by products in addition to the desired hydrogenation product. These products can be separated and the desired hydrogenation products can be isolated by conventional physical methods, such as fractional crystallization and the like from solvents such as alcohol, chloroform, 2-ethoxy ethanol, benzene and heptane, or by chromatographic separation. If the desired product does not otherwise contain active hydrogen groups, the reaction product can be reacted with reagents such as organic isocyanates, which react readily with hydroxy compounds, to facilitate separation of the products. Further information regarding the preparation and properties of the crown compounds including numerous representative species appears in applicant's copending application Ser. No. 588,302, filed Oct. 21, 1966, now abandoned.

The isocyanate trimerization catalysts of this invention are complexes of the crown compounds described above and the cation of a basic alkali metal salt. Each cation complexes with at least one molecule of the crown compound. Most complexes have 1:1 ratio of cation to crown compound; however, some of the complexes containing larger cations are known to have a 1:2 ratio. The cation can be organic or inorganic. Regardless of the ratio, the complexes are prepared in the manner described hereinafter. These complexes will also hereinafter be referred to as "crown complexes." By "basic" is meant a Lewis base. Any of the crown compounds described in applicant's copending application described above can be used. Any basic alkali metal salt can be employed so long as the resulting crown complex is soluble in the isocyanate to be trimerized. Representative salts are the hydroxides, alkoxides, phenoxides, acetates, 2-ethyl hexanoates, cyanides and benzoates. The preferred complexes are those obtained from the saturated cyclic polyether crown compounds described above and the strongly basic sodium and potassium salts such as the hydroxide, acetate, 2-ethylhexanoate, amide and cyanide. Especially preferred are complexes of 2,5,8,15,18,21-hexaoxa-tricyclo[20.4.0.0$^{9.14}$]hexacosane and the potassium salts of phenols, e.g., 2,4,6-tri-tert-butyl phenol, unsubstituted phenol, o-tert-butyl phenol and p-tert-butyl phenol. The preferred complexes induce faster rates of trimerization with minimal formation of isocyanate dimers.

The complexes of the crown compounds with alkali metals can be prepared by one or more of the following methods:

Method 1—One mole of polyether and one mole the metal compound are dissolved in a suitable solvent which is later removed by evaporation from the resulting complex, usually under vacuum.

Method 2—One mole of polyether and one mole or more of the metal compound are dissolved in a minimum quantity of hot solvent, the resulting complex being precipitated by cooling and mechanically separated, e.g., by filtration, centrifugation, etc.

Method 3—One mole of polyether is heated with one mole or more of the metal compound in a solvent in which only the latter is readily soluble, the polyether being converted into a crystalline complex without the system ever becoming a clear solution. The complex is recovered by filtration.

Method 4—One mole of polyether is warmed with thorough mixing with one mole of the metal compound. No solvent is used.

Method 5—A benzene solution of cyclic ether potassium hydroxide complex of known concentration is reacted with a protonated anion, e.g. (cyclic ether-KOH) +NH$_3$ → (cyclic ether-KNH$_2$+H$_2$O)

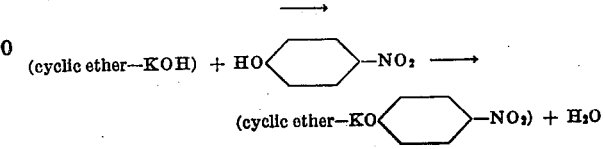

The water formed in the reaction can either be left in the solution or removed, if possible, with a chemically inert drying agent or by azeotropic distillation. The solid complex, if desired, can be obtained by removing the benzene under vacuum. An example of a suitable cyclic ether is 2,5,8,15,18,21-hexaoxatricyclo[20.4.0$^{9.14}$]hexacosane. When the crown complex cannot be isolated because of its instability, it can be used in the solvent in which it was prepared.

In general the ability to form complexes with alkali and alkaline earth metal salts depends principally on the size of the macrocyclic polyether ring. For a ring of 14 carbon atoms having oxygen atoms disposed therein alternately separated by two and three carbon atoms, complexes with the alkali metals are formed only with Li$^+$ and Na$^+$. With macrocyclic polyethers having five oxygen atoms in the ring joined by five chains of two carbon atoms, complexes are formed with Li$^+$, Na$^+$ and K$^+$. With macrocyclic compounds having six or more oxygen atoms in the ring joined by six chains of two carbon atoms, complexes are formed with Li$^+$, Na$^+$, K$^+$ and Cs$^+$.

In complexes of alkali metal compounds, substituents in the macrocyclic polyether ring do not greatly affect the formation of the crown complexes. However, substituents do influence considerably the properties of the complexes, particularly the solubility properties of the complexes which are formed. In general the saturated crown compounds, made by the hydrogenation of the aromatic crown compounds, form complexes which are more soluble and which are more stable than complexes formed with the corresponding aromatic compound. In some instances the complexes are more soluble in organic solvents than the crown compounds themselves.

Further details regarding methods of preparation, isolation, solubility characteristics and other properties and representative examples of crown complexes useful in this invention can be found in applicant's copending application Ser. No. 588,302, filed Oct. 21, 1966, now abandoned.

The basic salt crown complexes are useful for effecting the trimerization of organic isocyanates in general; including aliphatic, cycloaliphatic, aromatic and aralkyl types having one or more isocyanato groups per molecule. Representative isocyanates are 4,4'-methylenebis (cyclohexyl isocyanate), tetramethylene diisocyanate, hexamethylene diisocyanate, 3-methoxypropyl isocyanate, phenyl isocyanate, ethyl isocyanate, 4-chlorophenyl isocyanate, benzyl isocyanate, xylylene diisocyanate, 2,4-tolylene diisocyanate, 2,6-tolylene diisocyanate, 2,4,6-triisocyanatotoluene, 4,4'-diisocyanatodiphenylmethane, naphthalene-1,5-diisocyanate and polymeric polyisocyanates such as those prepared by the phosgenation of polyamines present in crude undistilled 4,4'-methylene dianiline made by condensing aniline and formaldehyde in the presence of mineral acid. Mixtures of isocyanates can also be trimerized.

The process of this invention is also useful in trimerizing crude or undistilled isocyanate mixtures that contain complex, high molecular weight, tarry materials produced by the reaction of phosgene and an organic amine. Such phosgenation byproducts are generally considered by those skilled in the art to be comprised largely of biuret and polymeric biuret molecules having free isocyanato groups. These isocyanato groups can participate in trimer formation along with the isocyanato groups of other mono- and polyisocyanates present. Successful trimerization of such crude isocyanate mixtures is of considerable importance since certain trimerized crude isocyanate mixtures are especially valuable in the preparation of polyurethane rigid foams.

The crown complexes of this invention can also be used to cross-link low-molecular weight polymers having –NCO groups.

The trimerization reaction of this invention can be carried out in the presence of dry, inert (to the crown complexes and isocyanates) solvents such as benzene, toluene, acetone and various fluorocarbons such as chlorodifluoromethane. It is possible to prepare solutions of isocyanate trimers which can be used directly without isolation of the products. Such solutions are especially useful in the formulation of protective coatings, impregnating resins, and the like. When the isocyanate to be trimerized is a liquid, no solvent is required. In such cases the solid crown complex is added directly to the liquid isocyanate.

In carrying out the process of this invention about 0.01–1.0 parts of the crown complex are employed per 100 parts of isocyanate. The preferred quantity of catalyst is about 0.02–0.5 part per 100 parts of isocyanate. With aromatic isocyanates trimerization can be initiated at room temperature by merely adding the crown complex to the isocyanate. Due to the exothermic nature of the reaction, the temperature rises if cooling is not provided. In the case of aliphatic isocyanates which trimerize sluggishly relative to aromatic isocyanates, it may be desirable to heat the reaction mass to provide a reasonable rate of reaction. In general, the reaction should be carried out as rapidly as possible and at the lowest temperature practicable. The best temperature range must be determined for each isocyanate since they have varying degrees of reactivity, but can routinely be determined by one skilled in the art.

A preferred procedure for preparing trimers from 2,4- or 2,6-toluene diisocyanate or mixtures thereof involves adding about 0.03 parts of the complex of 2,5, 8,15,18,21-hexaoxa tricyclo[20.4.0.0⁹·¹⁴]hexacosane and the potassium salt of 2,4,6-tri-tert-butyl phenol to 100 parts of diisocyanate at about 25°–50° C. The complex is conveniently handled in the form of a concentrated solution in benzene. Following catalyst addition, the reaction mass is allowed to heat up of its own accord. On reaching a temperature of about 120°–160° C., the reaction stops automatically with commercial grades of diisocyanate apparently due to deactivation of the catalyst. When run on a large scale, enough of a hydrolyzable chlorine compound such as benzoyl chloride should be present in the diisocyanate prior to catalyst addition to provide about 0.2 percent by weight hydrolyzable chlorine. This insures cut off of the reaction at 120°–160° C. At this point, about 40–60percent of the toluene diisocyanate has been converted to trimer and very little polymeric material has been formed. The solution of trimer in diisocyanate can be used as such, diluted with additional diisocyanate, or isolated by removing unreacted diisocyanate by vacuum distillation.

The catalysts of this invention have many advantages over those of the prior art. They are safe to handle, can be used in relatively low-concentrations and when used as directed above, do not cause the formation of significant amounts of the dimer or polymerization beyond the trimer stage.

The invention will now be illustrated by reference to the following examples wherein parts and percentages are by weight unless otherwise indicated. Throughout the examples, the following abbreviations are used.

"Crown XXXIX" = 2,5,8,15,18,21-hexaoxa-tricyclo-[20.4.0.0⁹·¹⁴]hexacosane. "2B alcohol" = a denatured alcohol composition consisting of 91.75 percent by weight ethyl alcohol, 0.5 percent by weight benzene and the remainder water.

"Crown XVIII" = 2,3,11,12-dibenzo-1,4,7,10,13,16-hexoxacyclooctadeca-2,11-diene.

The invention is further illustrated by the following examples wherein parts and percentages are by weight unless otherwise indicated.

EXAMPLE 1

One-tenth milliliter of an 0.156 N benzene solution of the Crown XXXIX complex of potassium hydroxide (prepared by method 1 above using methanol as the solvent) is added to a solution of 2 ml. of phenyl isocyanate in 4 ml. of benzene. The temperature of the mixture rises to 33° C. within a few minutes. A water bath is used to cool the mixture. After one hour at 25°–33° C., precipitated triphenyl isocyanurate is filtered off, washed with hexane to remove solvent and any unreacted phenyl isocyanate, and dried in a vacuum oven at 100° C. The product consists of 1.88 g. of white solid, m.p. 275°–280° C. The melting point of triphenyl isocyanurate is known to be 280°C., (Jones and Savill, J. Chem. Soc., 4392 (1957)).

EXAMPLE 2

Two milliliters of phenyl isocyanate, 3 ml. of benzene, and 3 drops of Crown XXXIX –NH₂ complex in benzene (0.25 percent nitrogen, made by method 5 above) are mixed in a 20 ml. vial at 26° C. After 33 minutes copious amounts of white solids have formed. The mixture is triturated with 20 ml. of n-heptane and dried in a vacuum oven at 40° C. The product consists of 2.08 g. (95.4 percent yield) of crystalline solid, m.p. 277°–278° C.

EXAMPLE 3

To a solution of 5 ml. of ethyl isocyanate in 40 ml. of benzene is added 0.2 ml. of 0.156 N Crown XXXIX–KOH complex in benzene (prepared by method 1 above using methanol as the solvent). The mixture is refluxed in an atmosphere of nitrogen for two hours, after which the volatile constituents are evaporated under reduced pressure to leave 2.6 g. of an oily solid. This is recrystallized from 2B alcohol to give 1.91 g. of triethyl isocyanurate, m.p. 87°–90° C. The melting point of triethyl isocyanurate is known to be 95° C. (Ber. 3, 765 (1870).

EXAMPLE 4

Forty milliliters of 2,4-toluene diisocyanate is stirred and heated to 50° C. in an atmosphere of nitrogen, and 0.2 ml. of an 0.15 M solution of the complex of Crown XXXIX and potassium 2,4,6-tri-t-butyl phenolate in benzene (made by method 5 above) is then added. The temperature of the reaction mixture rises spontaneously to 61°C. and is then reduced to 50° C. by cooling and is held at about 50° C. for two hours. After this period the mixture is a white paste which can no longer be stirred. The mixture is allowed to stand at room temperature for several days. It is found to contain 35.4 percent free isocyanate groups, corresponding to a 53 percent conversion to a trimer.

The reaction is slowly heated to 220° C. over a five-hour period at 0.2–0.5 tor., during which time 22 ml. of distillate, primarily unchanged toluene diisocyanate, is collected. The residue is a yellow, benzene-soluble resin containing 22.1 percent free –NCO groups. Pure toluene diisocyanate trimer would contain 24.1 percent –NCO groups. Infrared spectral analysis confirms the presence of the trimer (isocyanurate structure).

EXAMPLE 5

An electrically heated stirred resin kettle is charged with 200 ml. of 80:20 mixture of 2,4- and 2,6-toluene diisocyanate and 2.2 ml. of an 0.1 M solution of Crown XXXIX and potassium 2,4,6-tri-t-butyl phenolate complex in toluene made by method 5 above except the solvent is toluene. The mixture heats to 150° C. in 6 minutes and is then evacuated with a mechanical pump. Unchanged toluene diisocyanate distills out. After 24 minutes a final temperature of 162° C. is reached, and the mixture is too viscous to stir. The mixture is heated to 200° C. and vacuum maintained for an additional 0.5 hour. After cooling under nitrogen, the remaining resinous is found to contain 21.9 percent free –NCO groups. Infrared spectral studies of the product shown the presence of the trimer.

EXAMPLE 6

Thirty-five milliliters of a 0.0175 N solution of Crown XVIII and potassium hydroxide complex (made in methanol by method 1 above) in dimethyl sulfoxide is added dropwise to 200 ml. of 80:20 2,4-, 2,6 TDI while stirring. The temperature of the mixture rises to 35° C. during this period. The reaction continues exothermically, and after 6 minutes of additional stirring the mixture has reached a temperature of 107° C. The kettle is evacuated with a mechanical pump, and unreacted TDI is allowed to distill out. The trimerized residue consists of 200 grams of a brittle resin containing 20.0 percent free–NCO groups. The trimer is identified by infrared analysis.

All of the products prepared in the foregoing examples contain less than 1 percent by weight isocyanate dimers.

What is claimed is:

1. A process for trimerizing organic isocyanates which consists essentially of mixing said isocyanates with a catalytic quantity of a complex of a basic alkali metal salt and one to two moles per gram-atom of the cation of said salt of a macrocyclic polyether consisting of one or two arylene dioxy groups or derivatives thereof, said arylene dioxy groups being phenylene, naphthylene, anthrylene, or phenanthrylene dioxy groups, and said derivatives of arylene dioxy groups being
a. substituted derivatives of said arylene dioxy groups wherein the substituents are halo, nitro, azo, alkyl, aryl, aralkyl, alkoxy or cyano,
b. fully saturated hydrogenated products of said arylene dioxy groups, or
c. fully saturated hydrogenated products of the substituted arylene dioxy groups enumerated in (a) above, joined together to form a macrocyclic polyether ring of 14-60 atoms by $\alpha$, $\omega$-diprimary $C_2$-$C_6$ alkylene or $\alpha\omega$-diprimary $C_2$-$C_6$ alkylene ether groups, the oxygen atoms of said macrocyclic ring being separated by two or three carbon atoms.

2. A process of claim 1 wherein the macrocyclic polyether has the formula

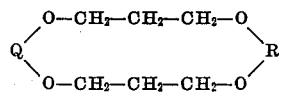

wherein Q is a vicinal phenylene group or the fully hydrogenated derivative thereof and R is the same as Q or an ethylene group.

3. A process of claim 2 wherein the basic alkali metal salt is a sodium or potassium hydroxide, amide, acetate, 2-ethyl hexanoate, cyanide or phenolate.

4. A process of claim 2 wherein the basic alkali metal salt is a potassium phenolate.

5. A process of claim 2 wherein the macrocyclic polyether has the formula

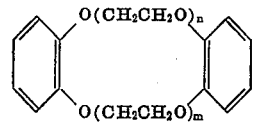

wherein n is from one to nine and m is from two to nine.

6. A process of claim 5 wherein the basic alkali metal salt is a sodium or potassium hydroxide, amide, acetate, 2-ethyl hexanoate, cyanide or phenolate.

7. A process of claim 2 wherein the said macrocyclic polyether has the formula

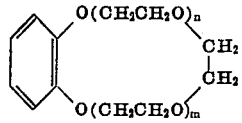

wherein n +m is from three to eight.

8. A process of claim 7 wherein the basic alkali metal salt is a sodium or potassium hydroxide, amide, acetate, 2-ethyl hexanoate, cyanide or phenolate.

9. A process of claim 2 wherein said macrocyclic polyether has the formula

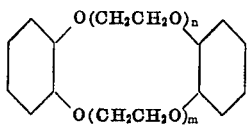

wherein n is from one to nine and m is from two to nine.

10. A process of claim 9 wherein the alkali metal salt is a sodium or potassium hydroxide, amide, acetate, 2-ethyl hexanoate, cyanide or phenolate.

11. A process of claim 9 wherein the basic alkali metal is a potassium phenolate.

12. A process of claim 9 wherein the macrocyclic polyether is 2,3,11,12,-dibenzo-1,4,7,10,13,16-hexoxacyclo-octadeca-2,11-diene and the basic alkali metal salt is sodium or potassium hydroxide, amide, acetate, 2-ethyl hexanoate, cyanide or phenolate.

13. A process of claim 12 wherein the organic isocyanate is a tolylene diisocyanate.

14. A process of claim 2 wherein the macrocyclic polyether has the formula

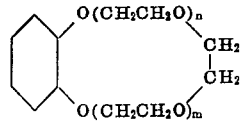

wherein n +m is from 3 to 8.

15. A process of claim 14 wherein the basic alkali metal salt is a sodium or potassium hydroxide, amide, acetate, 2-ethyl hexanoate, cyanide or phenolate.

16. A process of claim 15 wherein the isocyanate is a tolylene diisocyanate.

* * * * *